(12) United States Patent
Lee et al.

(10) Patent No.: US 11,513,630 B2
(45) Date of Patent: Nov. 29, 2022

(54) TOUCH OPERATION SENSING DEVICE USING IMPEDANCE CHANGE CAUSED BY TOUCH OPERATION

(71) Applicant: Samsung Electro-Mechanics Co., Ltd., Suwon-si (KR)

(72) Inventors: Joo Hyoung Lee, Suwon-si (KR); Joo Yul Ko, Suwon-si (KR); Jung Chul Gong, Suwon-si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 93 days.

(21) Appl. No.: 16/812,553

(22) Filed: Mar. 9, 2020

(65) Prior Publication Data
US 2021/0064179 A1 Mar. 4, 2021

(30) Foreign Application Priority Data

Aug. 27, 2019 (KR) .................. 10-2019-0105439
Nov. 26, 2019 (KR) .................. 10-2019-0153233

(51) Int. Cl.
*G06F 3/044* (2006.01)
*G06F 3/041* (2006.01)

(52) U.S. Cl.
CPC ............ *G06F 3/0418* (2013.01); *G06F 3/044* (2013.01)

(58) Field of Classification Search
CPC .... G06F 3/0418; G06F 3/044; G06F 3/04182; G06F 3/046; G06F 3/0444
See application file for complete search history.

(56) References Cited

U.S. PATENT DOCUMENTS

| 2002/0036622 A1* | 3/2002 | Jaeger ................. G06F 3/03545 345/173 |
| 2014/0111475 A1* | 4/2014 | Bae ......................... H02J 50/12 345/174 |
| 2014/0176447 A1* | 6/2014 | Alameh ............ H04M 1/72454 345/173 |

(Continued)

FOREIGN PATENT DOCUMENTS

| CN | 203661024 U | 6/2014 |
| JP | 3472827 B2 | 12/2003 |

(Continued)

OTHER PUBLICATIONS

Korean Office Action dated Feb. 24, 2021 in counterpart Korean Patent Application No. 10-2019-0153233 (5 pages in English and 4 pages in Korean).

*Primary Examiner* — Jeff Piziali
(74) *Attorney, Agent, or Firm* — NSIP Law

(57) ABSTRACT

A touch operation sensing device configured to be added to an electronic device, the electronic device including a touch member disposed in a housing and having conductivity, the touch operation sensing device includes an oscillation circuit disposed on an internal side of the touch member and including an inductor element and a capacitor element to generate an oscillation signal in response to changed impedance during a touch operation through the touch member, and an insulating member disposed between a first terminal of the inductor element and the touch member, and between a second terminal of the inductor element and the touch member.

25 Claims, 14 Drawing Sheets

(56) References Cited

U.S. PATENT DOCUMENTS

| | | | | |
|---|---|---|---|---|
| 2014/0240285 | A1* | 8/2014 | Hermes | G06F 3/044 345/174 |
| 2015/0130649 | A1 | 5/2015 | Itakura et al. | |
| 2016/0018940 | A1* | 1/2016 | Lo | G06F 3/0446 345/174 |
| 2016/0041663 | A1* | 2/2016 | Chen | G06F 3/0443 345/174 |
| 2016/0231840 | A1* | 8/2016 | Bae | H02J 50/10 |
| 2016/0291778 | A1* | 10/2016 | Xi | G06F 3/046 |
| 2016/0341572 | A1* | 11/2016 | Fusare | G01B 7/14 |
| 2017/0371473 | A1* | 12/2017 | David | G06F 3/044 |
| 2018/0093695 | A1 | 4/2018 | Hattori et al. | |
| 2018/0101272 | A1* | 4/2018 | Xi | G06F 3/03545 |
| 2018/0120364 | A1* | 5/2018 | Lee | G01R 23/10 |
| 2018/0183914 | A9* | 6/2018 | Tsai | H01L 23/66 |
| 2018/0294757 | A1* | 10/2018 | Feng | G06F 30/36 |
| 2019/0102033 | A1* | 4/2019 | David | G06F 3/0448 |
| 2019/0391681 | A1* | 12/2019 | Hekmatshoartabari | G06F 3/046 |
| 2020/0014789 | A1* | 1/2020 | Rouaissia | G06F 3/044 |
| 2020/0271477 | A1* | 8/2020 | Kost | G01D 5/24 |
| 2021/0055805 | A1* | 2/2021 | Seger, Jr. | G06F 3/04162 |

FOREIGN PATENT DOCUMENTS

| | | |
|---|---|---|
| JP | 2012-168747 A | 9/2012 |
| JP | 2015-95865 A | 5/2015 |
| KR | 2002-0077836 A | 10/2002 |
| KR | 10-2009-0120709 A | 11/2009 |
| KR | 10-2011-0087004 A | 8/2011 |
| KR | 10-2011-0087014 A | 8/2011 |
| KR | 10-2018-0046833 A | 5/2018 |

\* cited by examiner

TOUCH OPERATION SENSING DEVICE USING IMPEDANCE CHANGE CAUSED BY TOUCH OPERATION

CROSS-REFERENCE TO RELATED APPLICATIONS

This application claims the benefit under 35 USC 119(a) of Korean Patent Application Nos. 10-2019-0105439 filed on Aug. 27, 2019, and 10-2019-0153233 filed on Nov. 26, 2019, in the Korean Intellectual Property Office, the entire disclosures of which are incorporated herein by reference for all purposes.

BACKGROUND

1. Field

This disclosure relates to a touch operation sensing device using an impedance change caused by a touch operation.

2. Description of the Background

In general, it is desirable that a wearable device be thin and have a simple, clean design. To achieve this, existing mechanical switches in wearable devices may be replaced with non-mechanical switches implemented using dustproof and waterproof technologies, enabling the production of wearable devices having seamless housings.

For the purpose of implementing and developing non-mechanical switches, current technologies such as touch-on-metal (ToM) technology in which a metal surface is touched, a capacitance sensing method using a touch panel, a microelectromechanical system (MEMS), a micro strain gauge, and other technologies have been developed. In addition, even a force touch function that can determine how hard a button has been pushed is under development.

In the case of an existing mechanical switch, a large size and a large amount of internal space may be required to implement a switching function, and a design may be somewhat untidy and a large space may be required due to an outwardly protruding shape of the switch, the structure of the switch not being integrated with an external case, and other problems.

In addition, there may be a risk of an electric shock due to direct contact with an electrically connected mechanical switch. Moreover, a structure of the mechanical switch may make it difficult to implement dustproofing and waterproofing.

In an existing switching device, there is need for a technology to precisely detect an impedance change, caused by a touch operation, irrespective of locations of a metal case and an internal coil or a distance between the metal case and the internal coil.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a touch operation sensing device configured to be added to an electronic device, the electronic device including a touch member disposed in a housing and having conductivity, the touch operation sensing device includes an oscillation circuit disposed on an internal side of the touch member and including an inductor element and a capacitor element to generate an oscillation signal in response to changed impedance during a touch operation through the touch member, and an insulating member disposed between a first terminal of the inductor element and the touch member, and between a second terminal of the inductor element and the touch member.

The touch operation sensing device may further include a touch operation detection circuit configured to detect a touch operation in response to the oscillation signal from the oscillation circuit.

The insulating member may include an integrated insulator disposed between the first terminal of the inductor element and the touch member and between the second terminal of the inductor element and the touch member.

The insulating member may include a first insulator disposed between the first terminal of the inductor element and the touch member, and a second insulator disposed between the second terminal of the inductor element and the touch member.

The inductor element may be disposed on one surface of a substrate disposed on an internal side of the touch member, and the capacitor element may be disposed on the one surface of the substrate to be spaced apart from the inductor element.

The oscillation circuit may include an inductance circuit including the inductor element, a capacitor circuit including the capacitor element to be electrically connected to the inductance element, and an amplifier circuit connected to the inductance circuit and the capacitor circuit, and configured to generate an oscillation signal having a resonant frequency, variable during a touch operation through the touch member.

The touch operation sensing device may further include a first conductor line electrically connecting the first insulator, attached to an internal side surface of the touch member, and the first terminal of the inductor element to each other, and a second conductor line electrically connecting the second insulator, attached to the internal side surface of the touch member, and the second terminal of the inductor element to each other.

A distance between the first terminal and the second terminal of the inductor element may be greater than half of a length of the inductor element in a length direction.

One surface of the inductor element may be disposed on an internal side surface of the touch member and the capacitor element may be disposed on another surface of the inductor element opposing the one surface, and a circuit part disposed on the other surface of the inductor element may include the touch operation detection circuit.

The touch operation detection circuit may include a frequency digital converter configured to convert the oscillation signal from the oscillation circuit into a count value, and a touch operation detector configured to detect a touch operation in response to the count value input from the frequency digital converter to output a detection signal.

The frequency digital converter may be configured to count a reference clock signal, divided by dividing an input reference clock signal by a division ratio, using the oscillation signal, to generate the count value.

The frequency digital converter may include a frequency down-converter configured to generate a reference clock signal divided by dividing an input reference clock signal by a division ratio, a periodic timer configured to count a one-period time of the divided reference clock signal using the oscillation signal to generate a periodic count value, and a cascaded integrator-comb (CIC) filter circuit configured to output the count value generated by performing cumulative amplification on the periodic count value received from the periodic timer.

The reference clock signal may have a frequency less than 0.5 times a frequency of the oscillation signal.

The CIC filter circuit may be configured to perform cumulative amplification of the periodic count value from the periodic timer using a cumulative gain determined in response to a predetermined integrating stage number, a predetermined decimator factor, and a predetermined comb differential delay order, and configured to provide the cumulatively amplified periodic count value.

The CIC filter circuit may include a decimator CIC filter configured to perform cumulative amplification of the periodic count value received from the periodic timer, and a first-order CIC filter configured to perform a moving average on an output value of the decimator CIC filter to output the count value with noise removed from the output value from the decimator CIC filter.

The touch operation detector may include a delay part configured to delay the count value, received from the frequency digital converter, by a time determined in response to a delay control signal to output a delayed count value, a subtraction part configured to output a difference value generated by subtracting the count value and the delayed count value received from the delay part, and a comparison part configured to compare the difference value, received from the subtraction part, with a predetermined threshold value to output a detection signal having a high level or a low level determined in response to the comparison result.

A mobile device may include the touch operation sensing device, a control circuit, and a touch operation detection circuit configured to detect a touch operation in response to the oscillation signal from the oscillation circuit, wherein in response to a detected touch operation, the control circuit may be configured to implement one or more of control power of the mobile device, lock the mobile device, navigate content display of a touch screen of the mobile device, control input to the touch screen, control color of the touch screen, control input to a speaker of the mobile device, and control volume of the speaker.

The mobile device may be a smartphone, a smartwatch, smart glasses, a virtual reality device, an augmented reality device, a head-mounted display, headphones, an earbud, a door lock, a vehicle smart key, a computer, or a refrigerator.

In another general aspect, an electronic device includes a housing, a touch member disposed in the housing and having conductivity, an oscillation circuit disposed on an internal side of the touch member and including an inductor element and a capacitor element to generate an oscillation signal in response to changed impedance during a touch operation through the touch member, and an insulating member disposed between a first terminal of the inductor element and the touch member, and between a second terminal of the inductor element and the touch member.

The touch member may be a conductor.

A first terminal of the inductor and a second terminal of the inductor may be disposed on an insulator disposed on a surface of the touch member on an internal side of the housing.

A first conductor line may be disposed between the first terminal and the insulator, and a second conductor line may be disposed between the second terminal and the insulator.

The insulator may include a first insulator disposed between the first conductor line and the touch member spaced apart from a second insulator disposed between the second conductor line and the touch member.

The insulator may include a first insulator disposed between the first terminal and the touch member spaced apart from a second insulator disposed between the second terminal and the touch member.

A substrate may be disposed inside of the housing and spaced apart from the touch member, wherein the inductor and the conductor may be disposed on a surface of the substrate spaced apart from each other.

A frequency down-converter may divide an input reference clock signal by a division ratio to output a divided reference clock signal, a periodic timer may count a one-period time of the divided reference clock signal using the oscillation signal to output a periodic count value, a cascaded integrator-comb (CIC) filter circuit may include a decimator CIC filter performing cumulative amplification of the periodic count value received from the periodic timer, and a first-order CIC filter performing a moving average on an output value of the decimator CIC filter to output the count value with noise removed from the output value from the decimator CIC filter, a delay part may delay the count value, received from the CIC filter circuit, by a time determined in response to a delay control signal to output a delayed count value, a subtraction part may subtract the count value and the delayed count value received from the delay part to output a difference value, and a comparison part may compare the difference value, received from the subtraction part, with a predetermined threshold value to output a detection signal having a high level or a low level determined in response to the comparison, wherein the oscillation circuit may include an amplifier circuit connected to the inductor and the capacitor, outputting the oscillation signal comprising a resonant frequency, which may vary during the touch operation, and wherein the touch operation may be determined in response to the detection signal.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
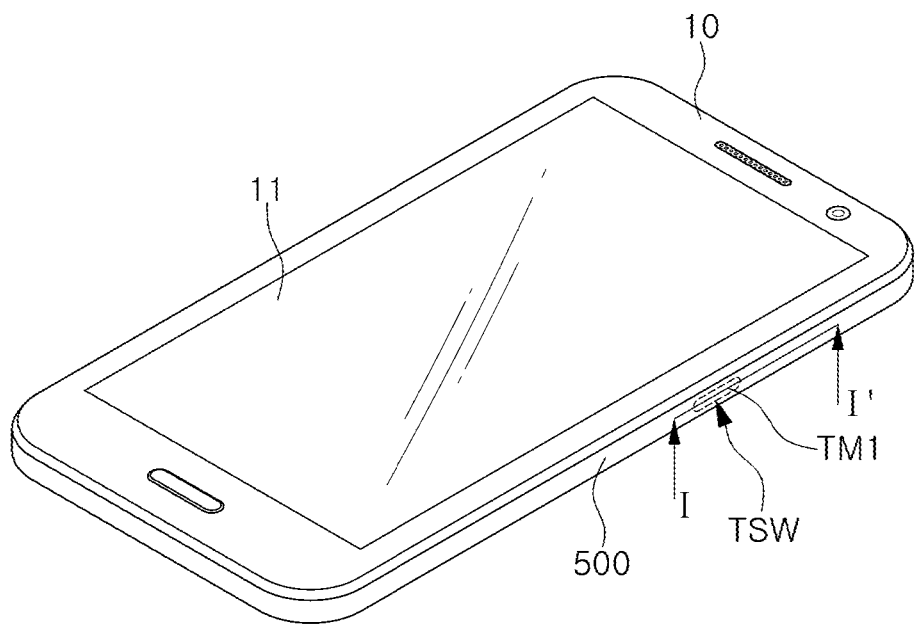
FIG. 1 is a perspective view illustrating one or more examples of a mobile device as disclosed herein.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure. Hereinafter, while embodiments of the present disclosure will be described in detail with reference to the accompanying drawings, it is noted that examples are not limited to the same.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein "portion" of an element may include the whole element or less than the whole element.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may be also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of this disclosure. Further, although the examples described herein have a variety of configurations, other configurations are possible as will be apparent after an understanding of this disclosure.

Herein, it is noted that use of the term "may" with respect to an example, for example, as to what an example may include or implement, means that at least one example exists in which such a feature is included or implemented while all examples are not limited thereto.

An aspect of the present disclosure is to provide a touch operation sensing device, capable of more precisely sensing a touch operation using an impedance change of a touch member in response to a touch operation of the touch member.

FIG. 1 is a perspective view illustrating one or more examples of a mobile device as disclosed herein.

Referring to FIG. 1, a mobile device 10 may include a touch screen 11, a housing 500, and a touch operation unit TSW including a touch member TM1, for example, as a replacement for a mechanical button switch.

The touch member TM1 may be integrated with the housing 500. In this case, the term "integrated" refers to the fact that irrespective of whether a material of the touch member and a material of the housing 500 are the same as each other or are different from each other, the touch member and the housing 500 are manufactured as a single body so that they cannot be separated from each other after manufacturing thereof and have a unitary structure, not an instrumentally or mechanically separated structure, in which there is no gap between the touch member and the housing 500.

In FIG. 1, the touch operation unit TSW is illustrated as including the touch member TM1. However, the touch member TM1 is merely an example for ease of description, and it will be understood that touch members are not limited to the touch member TM1 and the number of the touch members may be increased in the same manner as the touch member TM1.

As an example, referring to FIG. 1, the mobile device 10 may be a mobile device such as a smartphone or a wearable device such as a smartwatch. The mobile device 10 is not limited to a specific device, and may be a mobile device or a wearable electric device, or an electric device having a switch for operation control.

The housing 500 may be an external case exposed to the outside of an electric device. As an example, when the touch operation sensing device is applied to the mobile device 10, the touch operation sensing device may be a cover disposed on a side of the mobile device 10. As an example, the housing 500 may be integrated with a cover disposed on a rear surface of the mobile device 10 or may be separated from the cover disposed on the rear surface of the mobile device 10.

As described above, the housing 500 may be an external case of an electric device, and is not necessarily limited to a specific location, shape, or structure.

When describing examples in the drawings of the present disclosure, repeated descriptions may be omitted for components having the same reference numeral and the same function, while only differences may be described.

Figure 2:
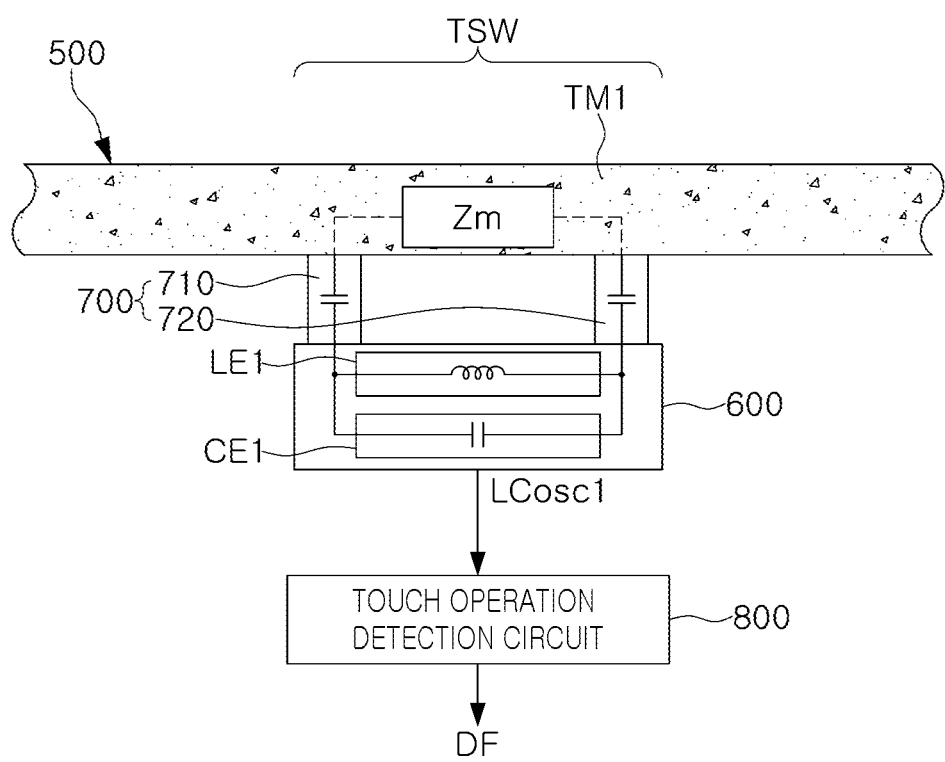
FIG. 2 is a cross-sectional view illustrating one or more examples of a touch operation sensing device of FIG. 1.

FIG. 2 is a cross-sectional view illustrating one or more examples of a touch operation sensing device of FIG. 1.

Referring to FIGS. 1 and 2, an example of a touch operation sensing device may include a touch operation unit TSW, an oscillation circuit 600, and an insulating member 700.

In addition, the touch operation sensing device may further include a touch operation detection circuit 800.

The touch operation unit TSW may include a touch member TM1 integrated with the housing 500 and having conductivity. As an example, the housing 500 may be a member having conductivity, similarly to the touch member TM1.

The oscillation circuit 600 may be disposed on an internal side of the touch member TM1, and may include an inductor element LE1 and a capacitor element CE1 to generate an oscillation signal LCosc1 in response to impedance variation during a touch operation through the touch member TM1.

For example, in this application, impedance, changeable when touched, may correspond to impedance in a distribution constant circuit, and may be at least one of resistance, capacitance, and inductance formed by a passive element, a passive component, various conductor wirings, or the like. In subsequent descriptions, since describing the impedance, changeable when touched, as capacitance is just an example for ease of description; however, the impedance is not limited thereto.

Figure 3:
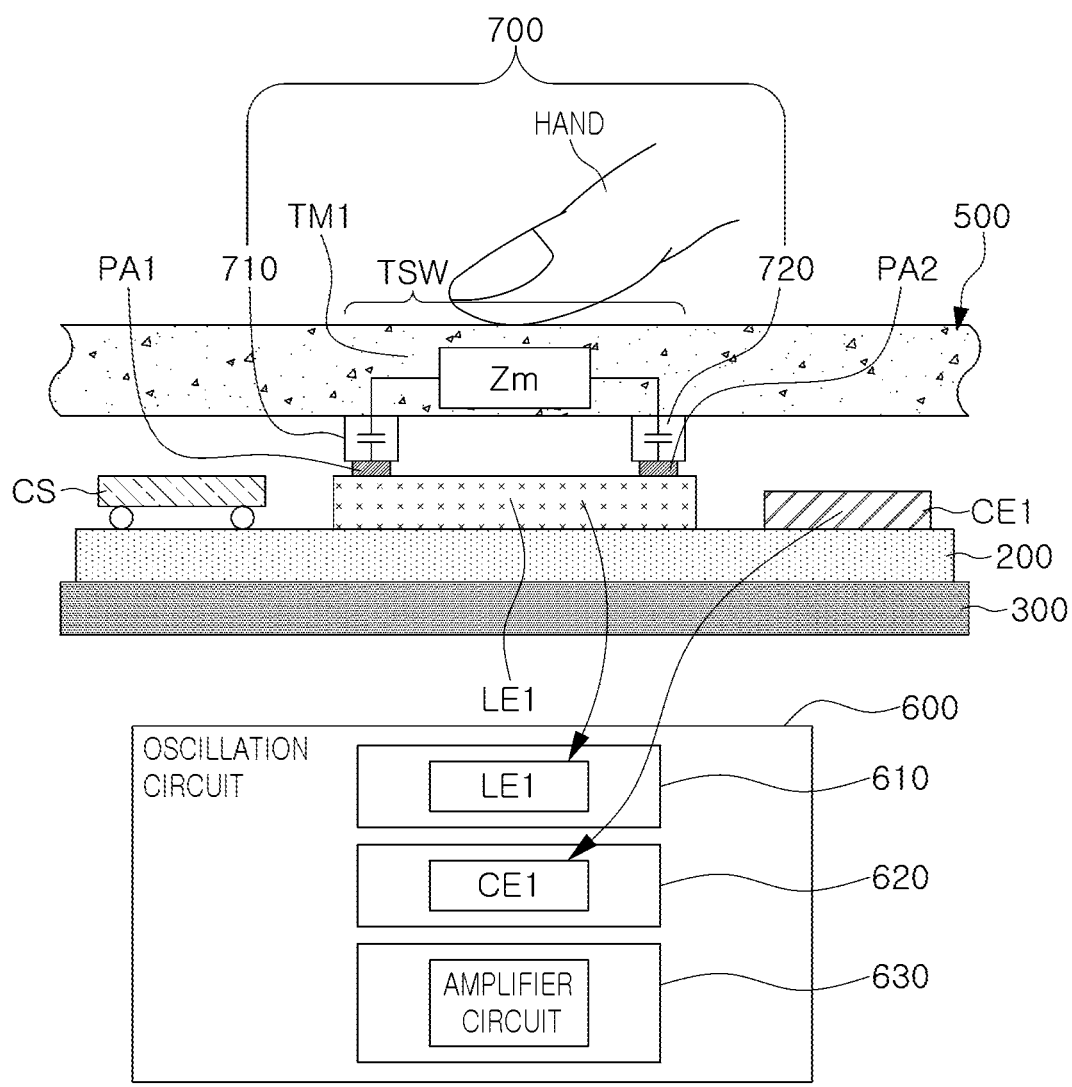
FIG. 3 is a cross-sectional view, taken along line I-I' in FIG. 1, illustrating one or more examples of the touch operation sensing device of FIG. 1.

The insulating member 700 may be disposed between a first terminal PA1 of the inductor element LE1 and the touch member TM1 and between a second terminal PA2 of the inductor element LE1 and the touch member TM1 (FIG. 3).

The touch operation detection circuit 800 may detect a touch operation using the oscillation signal LCosc1 from the oscillation circuit 600.

The impedance may be changed in response to an interaction of a touch body (for example, a human hand), the touch operation unit TSW, the insulating member 700, and the inductor element LE1 during the touch operation, which will be described in detail later.

As an example, the insulating member 700 may be made of an integrated insulator disposed between the first terminal PA1 of the inductor element LE1 and the touch member TM1 and between the second terminal PA2 of the inductor element LE1 and the touch member TM1. The integrated insulator may be an insulator composed of one body including the first insulator 710 and the second insulator 720.

FIG. 3 is a cross-sectional view, taken along line I-I' in FIG. 1, illustrating one or more examples of the touch operation sensing device of FIG. 1.

Referring to FIG. 3, the insulating member 700 may include a first insulator 710 and a second insulator 720.

The first insulator 710 may be disposed between the first terminal PA1 of the inductor element LE1 and the touch member TM1. The second insulator 720 may be disposed between the second terminal PA2 of the inductor element LE1 and the touch member TM1. The first terminal PA1 and the second terminal PA2 of the inductor element LE1 are connection pads for electrically connecting the first insulator 710 and the second insulator 720 to a substrate 200. As an example, the first terminal PA1 and the second terminal PA2 may be connection pads, each having a predetermined area for electrical connection and electrical characteristics.

The inductor element LE1 may be mounted on one surface of the substrate 200 disposed on an internal side of the touch member TM1. The capacitor element CE1 may be spaced apart from the inductor element LE1 on the one surface of the substrate 200.

The oscillation circuit 600 may include an inductance circuit 610, a capacitance circuit 620, and an amplifier circuit 630.

The inductance circuit 610 may include the inductor element LE1.

The capacitance circuit 620 may include the capacitor element CE1 and may be electrically connected to the inductance circuit 610 through the substrate 200.

The amplifier circuit 630 may be electrically connected to the inductance circuit 610 and the capacitance circuit 620 through the substrate 200. During a touch operation through the touch member (TM1), the amplifier circuit 630 may generate an oscillation signal LCosc1 having a variable resonant frequency. As an example, the amplifier circuit 630 may include an inverter or an amplifier maintaining resonance, generated by the inductance circuit 610 and the capacitance circuit 620, to generate an oscillation signal.

The substrate 200 may be supported by a support bracket 300. The support bracket 300 may support the substrate 200 and may be attached to an internal structure or a housing of an electric device in the examples described herein.

As an example, the housing 500 and the touch member TM1 may be made of a conductor such as a metal. For example, the inductor element LE1 may include a coil pattern having a spiral shape connected between the first terminal PA1 and the second terminal PA2.

The first terminal PA1 and the second terminal PA2 of the inductor element LE1 may be electrically connected to a circuit unit CS and the capacitor element CE1 through the substrate 200.

Accordingly, the inductor element LE1 may form a closed circuit through the first and second terminals PA1 and PA2, the first and second insulators 710 and 720, and the touch member TM1 of the housing 500. Such a closed circuit may have metal impedance Zm generated by the touch member TM1, and the metal impedance Zm may be capacitance, inductance, or a combination thereof.

The first insulator 710 and the second insulator 720 may also have first insulation capacitance and second insulation capacitance, respectively.

For example, the touch member TM1 may be integrated with the housing 500, and may be aluminum or another metal.

The insulating member 700 may be provided to electrically insulate the inductor element LE1 from the metal housing 500 and may be, for example, an adhesive tape or a bond, having adhesive force, or the like.

For example, since the insulating member 700 is disposed between the inductor element LE1 and the touch member TM1 of the housing 500 of a metal, the touch member TM1 of a metal may be modeled as a type of metal impedance Zm. The modeled metal impedance Zm may be changed when the touch member TM1 is touched by a human hand, and the metal impedance may be changed depending on a location, reached by the human hand, and areas of the first and second terminals PA1 and PA2. As an example, when the location reached by the human hand contacts is changed, impedance of the distribution constant circuit, corresponding to a distance from the contact point to the first and second terminals PA1 and PA2 of the inductor element LE1, may be changed. In addition, when the areas of the first and second terminals PA1 and PA2 are changed, the impedance may be changed depending on the changed areas.

For example, when a conductor such as a human hand does not touch the touch member TM1, metal impedance of the touch member TM1 is maintained at 'Zm.' Then, when the conductor such as a human hand touches the touch member TM1, the metal impedance of the touch member TM1 may be changed to 'Zm±α'.

Accordingly, when the metal impedance of the touch member TM1 is changed, in response to whether or not touch of the touch member, the resonant frequency of the oscillation circuit 600 may vary in response to the impedance change of the touch member TM1.

Herein, the term "touch or touch operation" refers to a conductor such as a human hand comes close to or directly touches a touch member of a housing, and a resonant frequency may be varied by metal impedance changed in response to such a touch operation.

The structure of the touch operation sensing device, illustrated in FIG. 3, is just an example, and thus, is not limited thereto.

Figure 4:
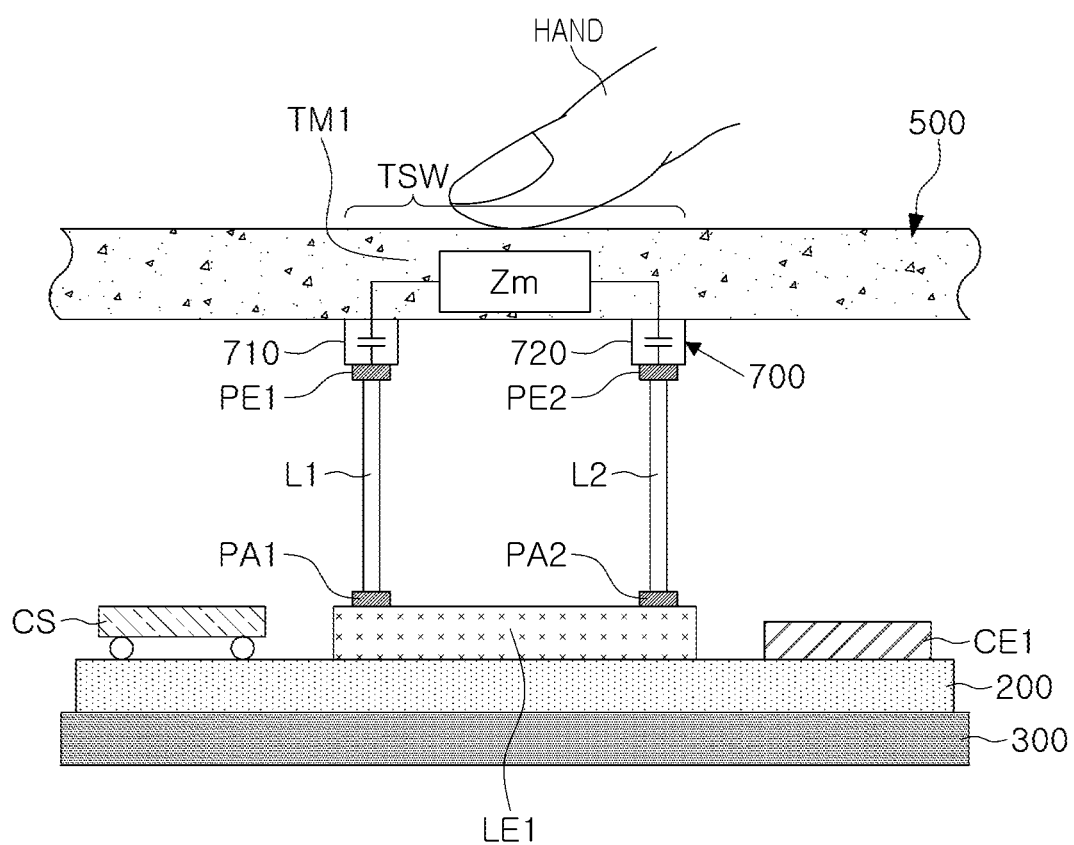
FIG. 4 is a cross-sectional view, taken along line I-I' in FIG. 1, illustrating one or more other examples of the touch operation sensing device of FIG. 1.

FIG. 4 is a cross-sectional view, taken along line I-I' in FIG. 1, illustrating one or more other examples of the touch operation sensing device of FIG. 1.

As compared to the touch operation sensing device in FIG. 3, a touch operation sensing device in FIG. 4 may further include a first conductor line L1 and a second conductor line L2.

The first conductor line L1 may electrically connect a first insulator 710, attached to an internal side surface of a touch member TM1, and a first terminal PA1 of an inductor element LE1 to each other.

The second conductor line L2 may electrically connect a second insulator 720, attached to the internal side surface of the touch member TM1, and a second terminal PA2 of the inductor element LE1 to each other.

As an example, the touch operation sensing device in FIG. 4 may include a first electrode PE1, disposed between the first insulator 710 and the first conductor line L1, and a second electrode PE2 disposed between the second insulator 720 and the second conductor line L2.

The first electrode PE1 may serve to electrically connect the first insulator 710 and the first conductor line L1 to each other, and the second electrode PE2 may serve to electrically connect the second insulator 720 and the second conductor line L2 to each other.

As illustrated in FIG. 4, the inductor element LE1 may be disposed to be distant from the touch member TM1. In this case, when a conductor such as a human hand, or the like, touches the touch member TM1, metal impedance of the touch member TM1 may be changed (Zm→Zm±α), and a distance between the touch member TM1 and the inductor element LE1 or a location of the inductor element LE1 may be more freely set by the first conductor line L1 and the second conductor L2. Accordingly, since the degree of freedom in the location of the inductor element LE1 may be improved to locate the inductor element LE1 in a desired location, space utilization may be improved.

As an example, the first conductor line L1 and the second conductor line L2 may be flexible conductor lines such that utilization of a disposition space is improved to increase the degree of freedom in a placement location and a placement distance. When such flexible first and second conductor lines L1 and L2 are used, locations of the first and second conductor lines L1 and L2 disposed in the inductor element LE1, a sensing element, may be freely selected.

As described above, the metal impedance may be capacitance, inductance, or a combination thereof. Accordingly, the resonant frequency of the oscillation signal LCosc1 (in FIG. 2), generated by the oscillation circuit, may vary when the metal impedance is changed.

Figure 5:
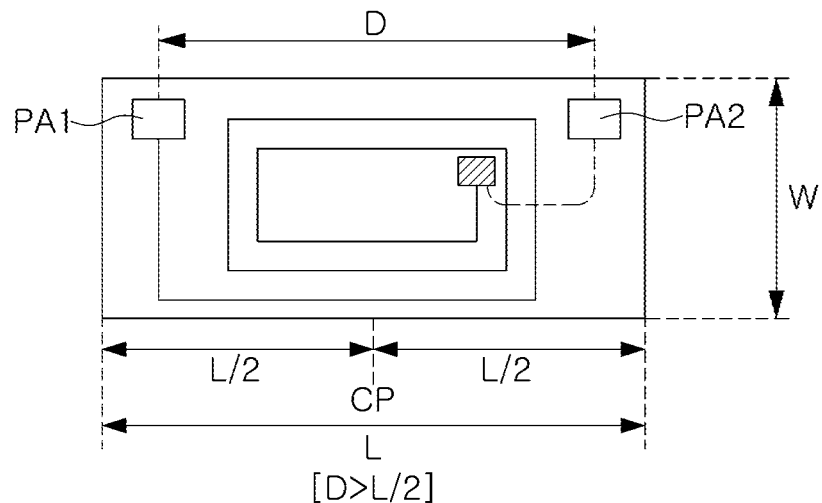
FIG. 5 is a plan view illustrating one or more examples of a distance between a first terminal and a second terminal of an inductor element.

FIG. 5 is a plan view illustrating one or more examples of a distance D between a first terminal and a second terminal of an inductor element.

Referring to FIG. 5, as an example, when a length of the inductor element LE1 in a horizontal direction is defined as 'L,' a length of the inductor element LE1 in a width direction is defined as 'W,' and a distance between the first terminal PA1 and the second terminal PA2 of the inductor element LE1 is defined as 'D,' the distance D between the first terminal PA1 and the second terminal PA2 of the inductor element LE1 may be greater than half of a length L of the inductor element LE1 in the length direction (L/2).

Since the distance D may affect a magnitude of the metal impedance Zm, sensitivity may be improved by increasing the distance D within the size of the inductor element LE1 as much as possible.

The inductor element LE1 may be one selected from the group consisting of a printed circuit board (PCB) coil, a flexible printed circuit board (FPCB) coil, a single-sided PCB coil, a double-sided PCB coil, a multilayer PCB coil, and a chip inductor.

As described above, the inductor element LE1 may include a flexible PCB (FPCB), and may include various types of PCB other than the FPCB. A circuit unit CS for sensing (for example, an integrated circuit (IC)) and a capacitor element CE1 may be provided on the same surface or opposing surfaces of a PCB.

For example, a ferrite sheet, not illustrated, may be disposed on a lower surface of the inductor element LE1, but is not necessarily required. The inductor element LE1 does not need to have a specific shape, and may have various shapes such as a circle, a rectangle, and the like.

The circuit unit CS may include a portion of the oscillation circuit 600 and a touch operation detection circuit 800. In this case, the portion of the resonance circuit 600 may be an amplifier circuit 630.

In addition, the circuit unit CS may or may not include a capacitor element CE1. When the capacitor element CE1 is not included in the circuit unit CS, the touch operation sensing device may include a capacitor element CE1 such as a multilayer ceramic capacitor (MLCC), or the like, disposed independently of the circuit unit CS. In each embodiment, the circuit unit CS may or may not be an integrated circuit.

Figure 6:
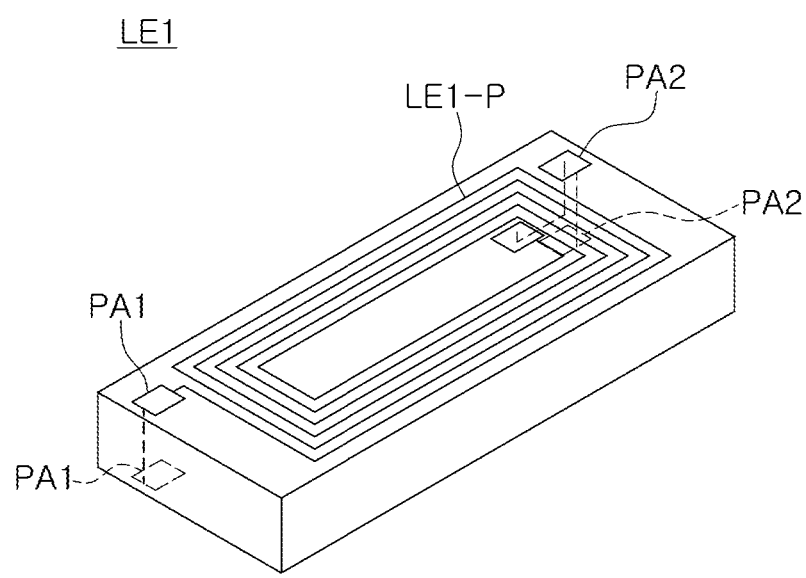
FIG. 6 is a perspective view illustrating one or more examples of the inductor element.
Figure 7:
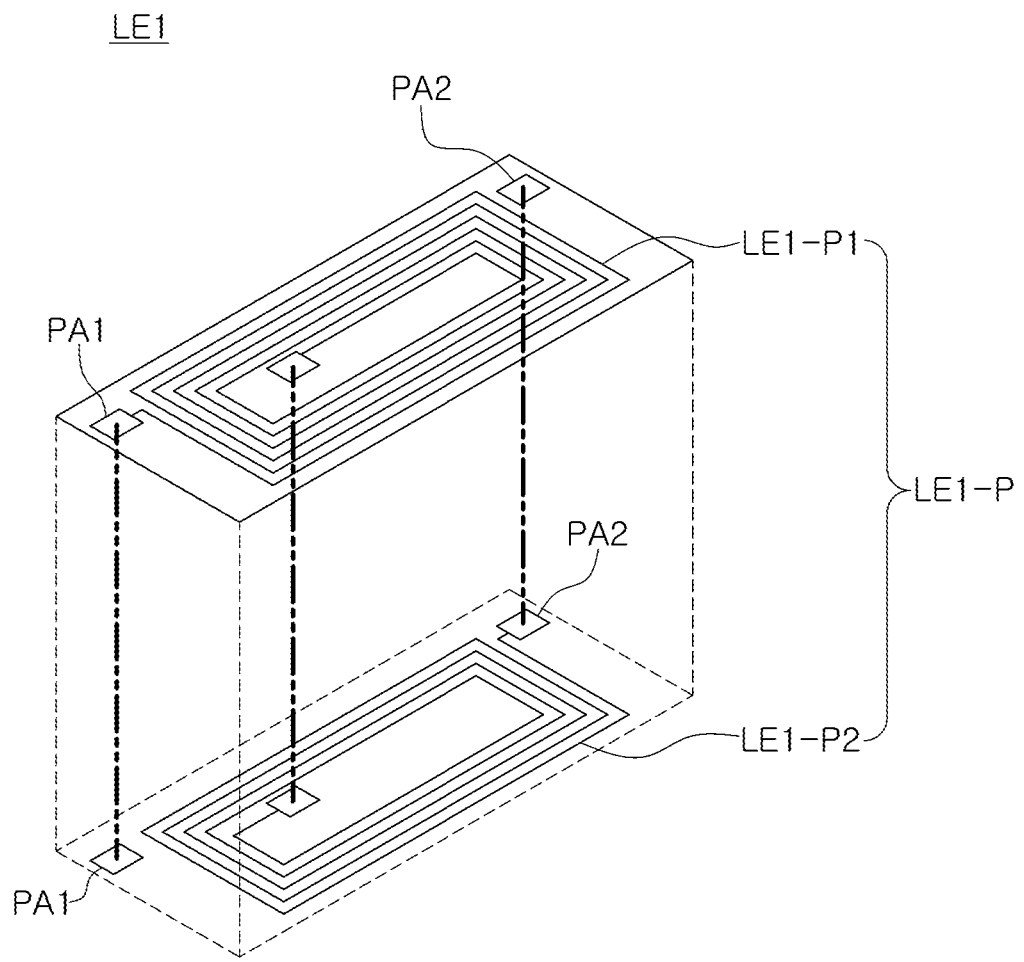
FIG. 7 is a perspective view illustrating one or more other examples of the inductor element.

FIG. 6 is a perspective view illustrating one or more examples of the inductor element, and FIG. 7 is a perspective view illustrating one or more other examples of the inductor element.

Referring to FIGS. 6 and 7, the inductor element LE1 is illustrated as an inductor element in the form of a printed circuit board (PCB) coil formed in a PCB pattern.

For example, the inductor element LE1 includes a coil pattern LE1-P having a spiral shape connected between the first terminal PA1 and the second terminal PA2, and the coil pattern LE1-P is a PCB pattern.

In one example, when a double-sided PCB having a first surface (for example, an upper surface) and a second surface (for example, a lower surface) is used, a pair of a first terminal PA1 and a second terminal PA2 may be disposed on the first surface to connect the double-sided PCB to first and second insulators 710 and 720 and another pair of a first terminal PA1 and a second terminal PA2 may be disposed on the second surface to connect the double-sided PCB to a substrate 200, as illustrated in FIG. 6.

The first terminal PA1 may be connected to an external end (or one end) of the coil pattern LE1-P through the first surface (for example, the upper surface), and the second terminal PA2 may be connected to an internal end (or the other end) of the coil pattern LE1-P through a via pattern via the inside thereof.

In another example, referring to FIG. 7, when a double-sided PCB having a first surface (for example, an upper surface) and a second surface (for example, a lower surface) is used, a pair of a first terminal PA1 and a second terminal PA2 may be disposed on the first surface to connect the double-side PCB to first and second insulators 710 and 720, and another pair of a first terminal PA1 and a second terminal PA2 may be disposed on the second surface to connect the double-side PCB to a substrate 200. A first coil pattern LE1-P1 may be formed on the first surface (for example, the upper surface), and a second coil pattern LE1-P2 may be formed on the second surface (for example, the lower surface). An internal side end of the first coil pattern LE1-P1 and an internal end of the second coil pattern LE1-P2 may be connected to each other through a through-conductor. An external side end of the first coil pattern LE1-P1 may be connected to the first terminal PA1, and an external side end of the second coil pattern LE1-P2 may be connected to the second terminal PA2 through the through-conductor.

For example, the inductor element LE1 may be formed to have various shapes such as a circle, a triangle, and a rectangle, and the like, but the shape is not limited thereto.

Unlike the description of the inductor element LE1 in the form of a double-sided PCB coil, the inductor element LE1 in FIGS. 6 and 7 may be implemented on a multilayer PCB having a plurality of layers. In this case, the first surface may be an upper surface of an uppermost layer of the multilayer PCB, and the second surface may be an upper surface of a lowermost layer of the multilayer PCB.

FIGS. 6 and 7 are just examples of the inductor element LE1 in the form of a double-sided PCB coil, and the inductor element LE1 is not limited thereto. As the inductor element LE1, any inductor element may be used as long as it is in the form of a PCB coil providing inductance to an oscillation circuit.

Figure 8:
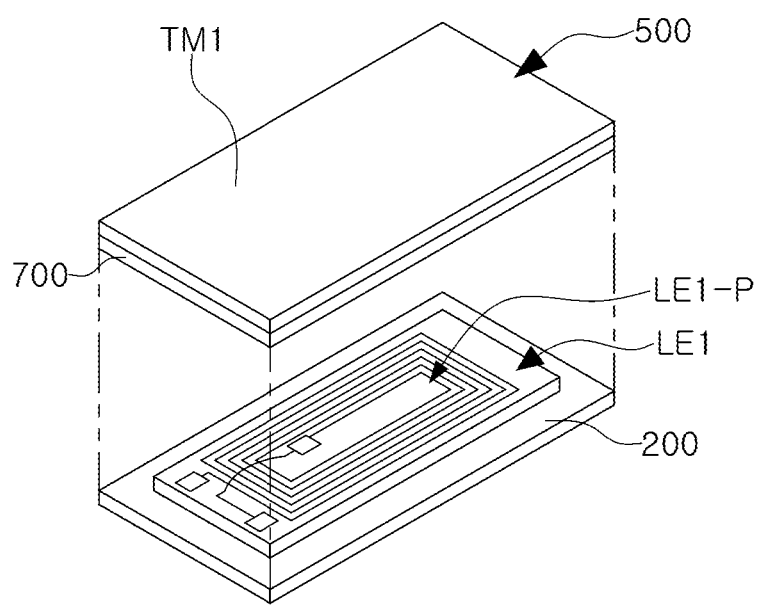
FIG. 8 is a perspective view illustrating one or more examples of a disposition of the inductor element.
Figure 8:
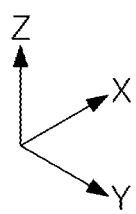
Figure 9:
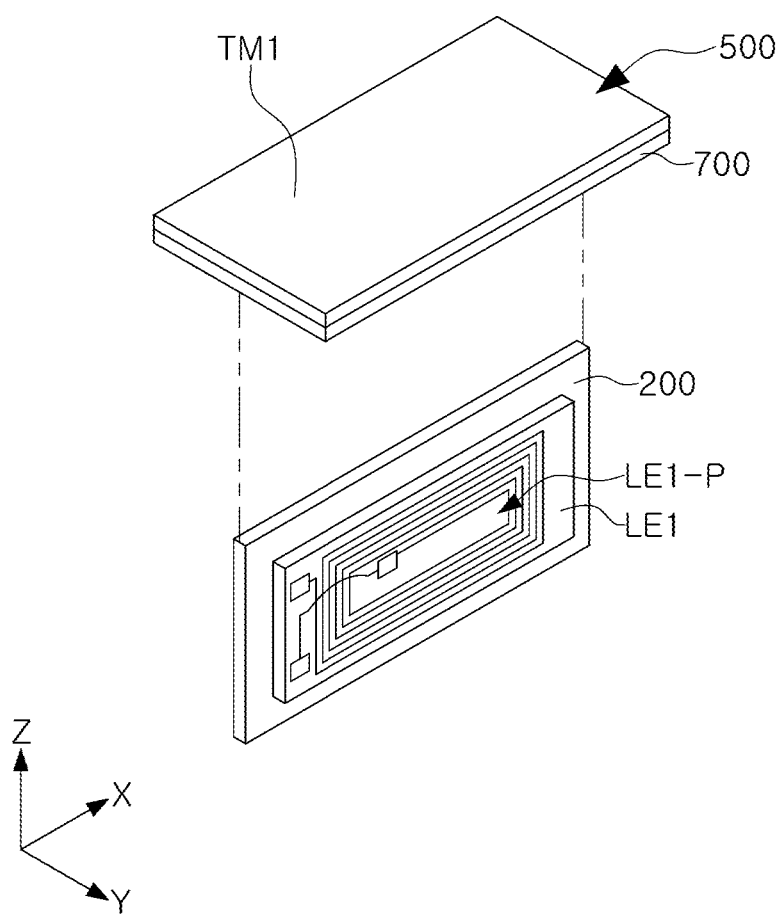
FIG. 9 is a perspective view illustrating one or more other examples of a disposition of the inductor element.

FIG. 8 is a perspective view illustrating one or more examples of a disposition of the inductor element, and FIG. 9 is a perspective view illustrating one or more other examples of a disposition of an inductor element.

Referring to FIG. 8, an inductor element LE1 is disposed on one surface of the substrate 200, facing a touch member TM1. The one surface of the substrate 200, on which the inductor element LE1 is disposed, may be disposed parallel to an internal side surface of the touch member TM1 while facing the internal side surface of the touch member TM1.

For example, in a three-dimensional (x, y, z) coordinate system of FIGS. 8 and 9, an x axis is defined as a length direction of the touch member TM1, a y axis is defined as a width direction of the touch member TM1, and a z axis is defined as an upward direction of the touch member TM1.

In the three-dimensional coordinate system, the substrate 200 and the touch member TM1 may each be disposed on an x-y plane while being spaced apart from each other, for example, in the z-axis direction.

Referring to FIG. 9, the inductor element LE1 is disposed on one surface of a substrate 200. As an example, the substrate 200, on which the inductor element LE1 is disposed, may be disposed in a direction substantially perpendicular to the touch member TM1, rather than parallel to the touch member TM1.

In a three-dimensional coordinate system, the touch member TM1 may be disposed on an x-y plane while being spaced apart from the substrate 200, for example, in the z-axis direction, and the substrate 200 may be disposed on an x-z plane.

Referring to FIGS. 8 and 9, it will be understood that the substrate 200, on which the inductor element LE1 is disposed, may be disposed in various ways with respect to the touch member TM1. Therefore, the disposition of the substrate 200 is not limited to the examples illustrated in FIGS. 8 and 9, and any disposition form and any location of the inductor element LE1 are not necessarily limited.

Figure 10:
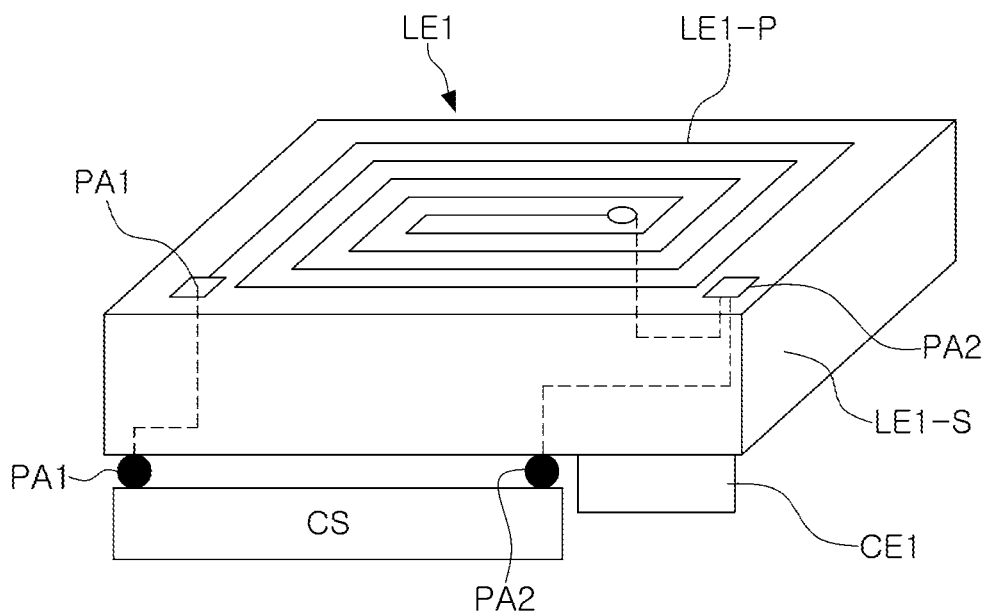
FIG. 10 illustrates one or more other examples of the inductor element.

FIG. 10 illustrates one or more other examples of an inductor element.

Referring to FIG. 10, the substrate 200 described in other examples may be omitted in this example.

A capacitor element CE1 may be disposed on another surface of an inductor element LE1 having one surface opposing the other surface attached to an internal side surface of a touch member TM1. In this case, a touch operation detection circuit 800 may be included in a circuit unit CS disposed on the other surface of the inductor element LE1.

The inductor element LE1 includes a multilayer PCB substrate LE1-S having an uppermost surface facing the touch member TM1 (see, for example, FIG. 2), and a lowermost surface opposing the uppermost surface.

The multilayer PCB substrate LE1-S may have at least a lowermost layer, an intermediate layer, and an uppermost layer. The lowermost layer may be a lower surface, and the uppermost layer may be an upper surface.

A capacitor element CE1 such as an MLCC, or the like, and a circuit unit CS may be disposed on the lower surface of the multilayer PCB substrate LE1-S. The circuit unit CS, the capacitor element CE1, and the coil pattern LE1-P may be electrically connected to each other through the multilayer PCB substrate LE1-S.

In the coil pattern LE1-P, a first terminal PA1 and a second terminal PA2 may be disposed on upper and lower surfaces of the multilayer PCB substrate LE1-S. The coil pattern LE1-P having a spiral shape may be connected between the first terminal PA1 and the second terminal PA2, and the coil pattern LE1-P may be a PCB pattern. A pair of first and second terminals PA1 and PA2, disposed on the upper surface, may be connected to first and second insulators 710 and 720, and another pair of first and second terminals PA1 and PA2 may be electrically connected to the circuit unit CS and the capacitor element CE1.

In addition, the touch operation detection circuit 800 may be included in the circuit unit CS disposed on the other surface of the inductor element LE1.

Figure 11:
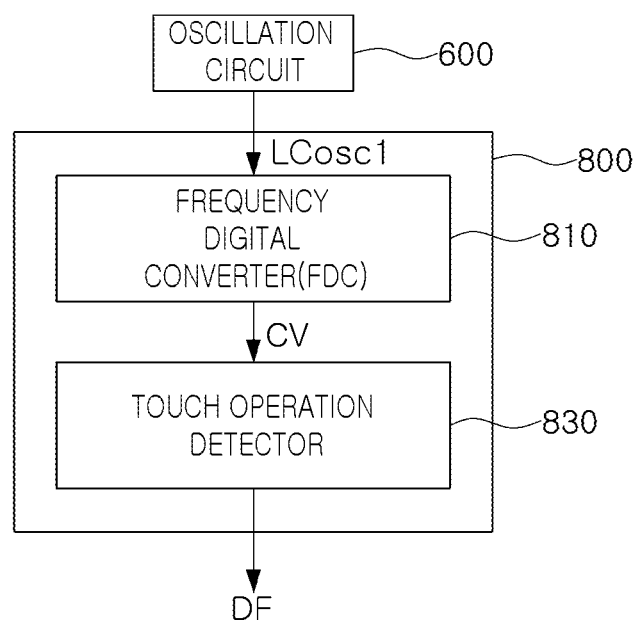
FIG. 11 is a block diagram illustrating one or more examples of a touch operation detection circuit.

FIG. 11 is a block diagram illustrating one or more examples of a touch operation detection circuit.

Referring to FIG. 11, a touch operation detection circuit 800 may include a frequency digital converter 810 and a touch operation detector 830.

The frequency digital converter 810 may convert an oscillation signal LCosc1 from the oscillation circuit 600 into a count value CV.

The touch operation detector 830 may detect a touch operation, in response to the count value CV input from the frequency digital converter 810, to output a detection signal DF.

Figure 12:
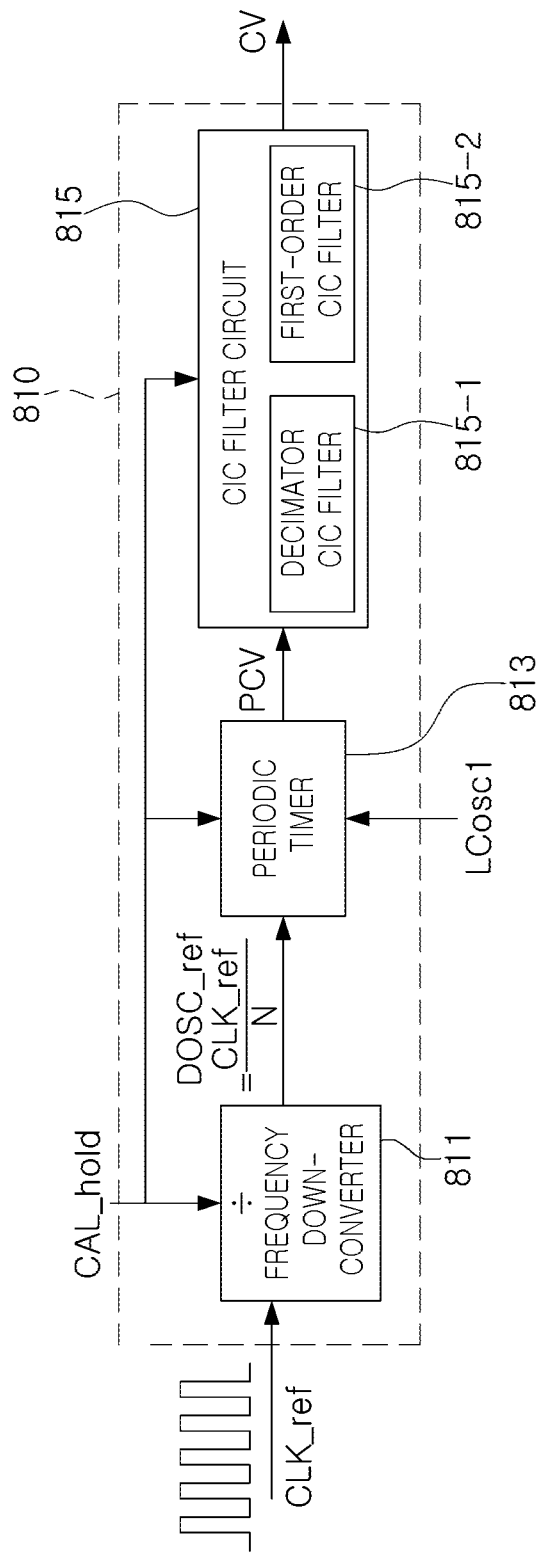
FIG. 12 is a circuit diagram illustrating one or more examples of a frequency digital converter.

FIG. 12 is a circuit diagram illustrating one or more examples of a frequency digital converter.

Referring to FIG. 12, a frequency digital converter 810 may divide an input reference clock signal CLK_ref by a division ratio N to generate a divided reference clock signal DOSC_ref and may count the divided reference clock signal DOSC_ref using an oscillation signal LCosc1 to generate a count value CV.

The frequency digital converter 810 may include a frequency down-converter 811, a periodic timer 813, and a cascaded integrator-comb (CIC) filter circuit 815.

The frequency down-converter 811 may divide an input reference clock signal CLK_ref by a division ratio N to generate a divided reference clock signal DOSC_ref.

The periodic timer 813 may generate a periodic count value PCV by counting one-period time of the divided reference clock signal DOSC_ref using the oscillation signal LCosc1.

The CIC filter circuit 815 may output the count value CV generated by performing cumulative amplification on the periodic count value PCV received from the periodic timer 813.

The CIC filter circuit 815 may perform cumulative amplification of the periodic count value PCV from the periodic timer 813 using a cumulative gain determined in response to a predetermined integrating stage number, a predetermined decimator factor, and a predetermined comb differential delay order, and may provide the cumulatively amplified periodic count value.

For example, the CIC filter circuit 815 may include a decimator CIC filter 815-1 and a first-order CIC filter 815-2.

The decimator CIC filter 815-1 may perform cumulative amplification of the periodic count value PCV received from the periodic timer 813.

The first-order CIC filter 815-2 may perform a moving average on an output value from the decimator CIC filter 815-1 to output the count value CV with noise removed from the output value from the decimator CIC filter.

For example, when the decimator CIC filter includes an integrating circuit, a decimator, and a differential circuit, the cumulative gain may be obtained as $(R*M)^S$ based on a stage order S of the integrating circuit, a decimator factor R, and a delay order M of the differentiating circuit. As an example, when the stage order S of the integrating circuit is 4, the decimator factor R is 1, and the delay order M of the differential circuit is 4, the cumulative gain is 256 $((1*4)^4)$.

The first-order CIC filter 815-2 may take a moving average, corresponding to a rope pass function, from a count value from the decimator CIC filter to remove noise.

Figure 13:
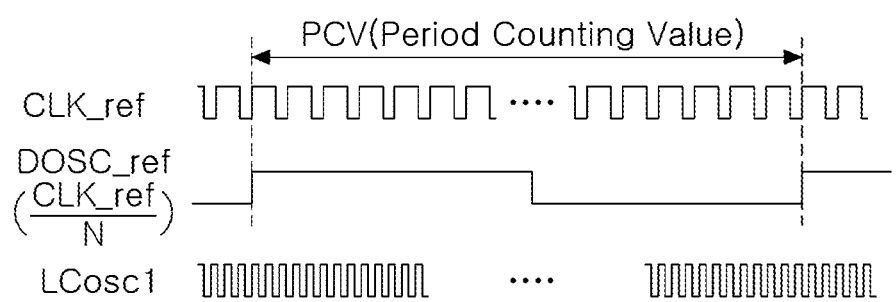
FIG. 13 illustrates one or more examples of main signals in the frequency digital converter of FIG. 12.

FIG. 13 illustrates one or more examples of main signals in the frequency digital converter of FIG. 12.

Referring to FIG. 13, CLK_ref denotes a reference clock signal, DOSC_ref denotes a divided reference clock signal, and LCosc1 denotes an oscillation signal.

The reference clock signal CLK_ref may have a frequency less than 0.5 times a frequency of the oscillation signal LCosc1.

Figure 14:
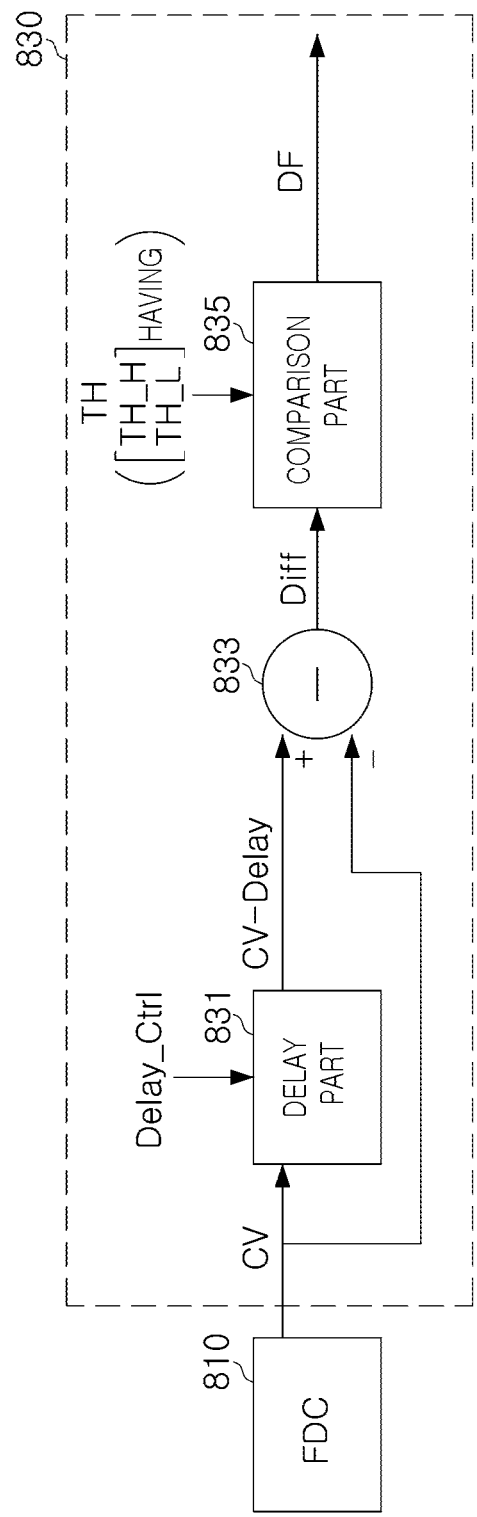
FIG. 14 is a circuit diagram illustrating one or more examples of a touch operation detector.

FIG. 14 is a circuit diagram illustrating one or more examples of a touch operation detector.

Referring to FIG. 14, a touch operation detector 830 may include a delay part 831, a subtraction part 833, and a comparison part 835.

The delay part 831 may delay a count value CV, received from a frequency digital converter 810, by a time determined in response to a delay control signal Delay_Ctrl to output a delayed count value CV_Delay.

The subtraction part 833 may output a difference value Diff generated by subtracting the count value CV and the delayed count value CV_Delay from the delay part 831.

The comparison part 835 may compare the difference value Diff, received from the subtraction part 833, with a predetermined threshold value TH to output a detection signal DF having a high level or a low level determined in response to the comparison result.

Figure 15:
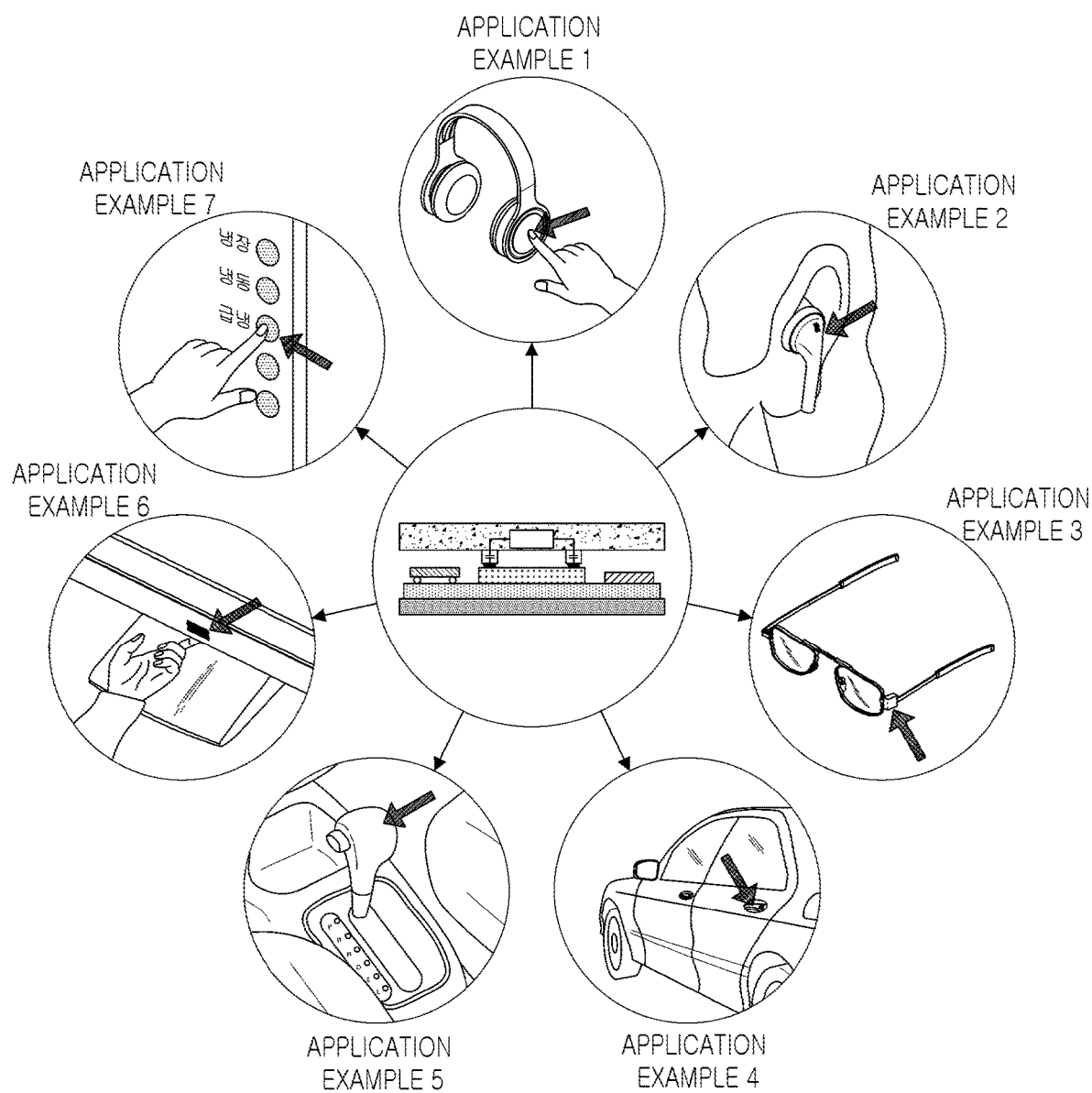
FIG. 15 illustrates one or more examples of various applications of a touch operation sensing device.

FIG. 15 illustrates one or more examples of various applications of a touch operation sensing device.

Referring to FIG. 15, Application Examples 1 to 7 of a touch operation sensing device are illustrated.

Application Example 1 of FIG. 15 is an example in which an operation control button of Bluetooth® headphones may be a touch operation sensing device, and Application Example 2 of FIG. 15 is an example in which an operation control button of a Bluetooth® earbud may be a touch operation sensing device. As an example, Application Examples 1 and 2 may be examples in which on/off power switches of Bluetooth® headphones and a Bluetooth® earbud may be touch operation sensing devices.

Application Example 3 of FIG. 15 is an example in which an operation control button of smart glasses may be a touch operation sensing device. As an example, Application Example 3 may be an example in which a button for performing functions such as a phone function and a mail function, a home button, and other buttons of a device such as Google Glasses, a virtual reality (VR) device, or an augmented reality (AR) device may be a touch operation sensing device.

Application Example 4 of FIG. 15 is an example in which a door lock button of a vehicle may be a touch operation sensing device. Application Example 5 of FIG. 15 is an example in which a button of a smart key of a vehicle may be a touch operation sensing device. Application Example 6 of FIG. 15 is an example in which an operation control button of a computer may be a touch sensing apparatus.

Application Example 7 of FIG. 15 is an example in which an operation control button of a refrigerator may be a touch operation sensing device.

In addition, a touch operation sensing device may be volume and power switches of a laptop computer, a switch of a VR device, a head-mounted display (HMD), a Bluetooth® earphone, a stylus touch pen, or the like, and may be applied to be buttons of a monitor of a home appliance, a refrigerator, a laptop computer, or the like.

For example, a touch operation sensing device being an operation control button of a device may be integrated with a cover, a frame, or a housing of the applied device, and may be used to turn power on and off, control a volume, and perform other specific functions (back, movement to home, locking, and the like).

In addition, a plurality of touch switches may be provided to perform a plurality of functions when corresponding functions (back, movement to home, locking, and the like) are performed.

The touch operation sensing device of the examples described herein is not limited to the above-mentioned devices, and may be applied to devices such as mobile and wearable devices requiring switches. In addition, a touch switch of the examples described herein may be applied to implement a seamless design.

When the above-described embodiments are applied to a mobile device, a thinner, simpler, and tidier design may be implemented and, unlike an existing capacitive sensing method, a high-cost analog-to-digital converter (ADC) is not required. In addition, a touch member integrated with a housing may be used to implement a switch having dustproof and waterproof functions and to perform capacitive sensing more precisely, even in a humid environment.

As described above, sensing may be precisely performed using an impedance change of a touch member in response to a touch operation of the touch member, irrespective of locations of a housing and an inductor element disposed inside of the housing or a distance between the housing and the inductor element.

In addition, an existing physical key used in a mobile or wearable device may be eliminated to address fundamental defects such as wear, failure, and the like, and a connection portion, exposed outwardly of the housing such as a physical key, may be eliminated to be advantageous for dustproof and waterproof.

Furthermore, an existing physical key, suffering from a defect such as outward protrusion, may be eliminated to achieve a simpler design and to reduce manufacturing costs.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A touch operation sensing device comprising:
   a conductor disposed in a housing:
   an oscillator disposed on an internal side of the conductor and comprising an inductor and a capacitor to generate an oscillation signal in response to changed impedance during a touch operation through the conductor; and
   an insulator disposed between a first terminal of the inductor and the conductor, and between a second terminal of the inductor separated from the first terminal of the inductor and the conductor,
   wherein the insulator comprises a first insulator disposed between the first terminal and the conductor spaced apart from a second insulator disposed between the second terminal and the conductor, such that a side surface of the first insulator faces a side surface of the second insulator, and
   wherein the inductor comprises a coil pattern having a spiral shape connected between the first terminal and the second terminal.

2. The touch operation sensing device of claim 1, further comprising:
   a touch operation detector configured to detect a touch operation in response to the oscillation signal from the oscillator.

3. The touch operation sensing device of claim 1, wherein the insulator comprises an integrated insulator disposed between the first terminal of the inductor and the conductor and between the second terminal of the inductor and the conductor.

4. The touch operation sensing device of claim 1, wherein the inductor is disposed on one surface of a substrate disposed on an internal side of the conductor, and
   the capacitor is disposed on the one surface of the substrate to be spaced apart from the inductor.

5. The touch operation sensing device of claim 4, wherein the oscillator comprises:
   an inductance circuit comprising the inductor;
   a capacitor circuit comprising the capacitor to be electrically connected to the inductance element; and
   an amplifier circuit connected to the inductance circuit and the capacitor circuit, and configured to generate the oscillation signal comprising a resonant frequency, variable during the touch operation through the conductor.

6. The touch operation sensing device of claim 1, further comprising:
   a first conductor line electrically connecting the first insulator, attached to an internal side surface of the conductor, and the first terminal of the inductor to each other; and
   a second conductor line electrically connecting the second insulator, attached to the internal side surface of the conductor, and the second terminal of the inductor to each other.

7. The touch operation sensing device of claim 1, wherein a distance between the first terminal and the second terminal of the inductor is greater than half of a length of the inductor in a length direction.

8. The touch operation sensing device of claim 2, wherein one surface of the inductor is disposed on an internal side surface of the conductor and the capacitor is disposed on another surface of the inductor opposing the one surface, and
   a circuit disposed on the other surface of the inductor comprises the touch operation detector.

9. The touch operation sensing device of claim 2, wherein the touch operation detector comprises:

a count value generator configured to convert the oscillation signal from the oscillator into a count value; and
a detection signal generator configured to detect a touch operation in response to the count value input from the count value generator to output a detection signal.

10. The touch operation sensing device of claim 9, wherein the count value generator is configured to count a reference clock signal, divided by dividing an input reference clock signal by a division ratio, using the oscillation signal, to generate the count value.

11. The touch operation sensing device of claim 9, wherein the count value generator comprises:
a reference clock signal divider configured to generate a reference clock signal divided by dividing an input reference clock signal by a division ratio;
a periodic timer configured to count a one-period time of the divided reference clock signal using the oscillation signal to generate a periodic count value; and
a cascaded integrator-comb (CIC) filter configured to output an amplified count value generated by performing cumulative amplification on the periodic count value received from the periodic timer.

12. The touch operation sensing device of claim 11, wherein the reference clock signal comprises a frequency less than 0.5 times a frequency of the oscillation signal.

13. The touch operation sensing device of claim 11, wherein the CIC filter is configured to perform cumulative amplification of the periodic count value from the periodic timer using a cumulative gain determined in response to an integrating stage number, a decimator factor, and a comb differential delay order, and configured to provide the cumulatively amplified periodic count value.

14. The touch operation sensing device of claim 11, wherein the CIC filter comprises:
a cumulative amplifier configured to perform cumulative amplification of the periodic count value received from the periodic timer; and
a noise remover configured to perform a moving average on an output value of the cumulative amplifier to output a count value with noise removed from the output value from the cumulative amplifier.

15. The touch operation sensing device of claim 9, wherein the detection signal generator comprises:
a delayed count value generator configured to delay the count value, received from the count value generator, by a time determined in response to a delay control signal to output a delayed count value;
a subtractor configured to output a difference value generated by subtracting the count value and the delayed count value received from the delayed count value generator; and
an operator configured to compare the difference value, received from the subtractor, with a threshold value to output a detection signal higher or lower than the threshold value determined in response to a result of the comparing.

16. A mobile device comprising:
the touch operation sensing device of claim 1;
a controller; and
a touch operation detector configured to detect a touch operation in response to the oscillation signal from the oscillator;
wherein in response to a detected touch operation, the controller is configured to implement one or more of control power of the mobile device, lock the mobile device, navigate content display of a touch screen of the mobile device, control input to the touch screen, control color of the touch screen, control input to a speaker of the mobile device, and control volume of the speaker.

17. The mobile device of claim 16, wherein the mobile device is a smartphone, a smartwatch, smart glasses, a head-mounted display, headphones, an earbud, a door lock, a vehicle smart key, a computer, or a refrigerator.

18. An electronic device, comprising:
a housing;
a conductor disposed in the housing and comprising conductivity;
an oscillator disposed on an internal side of the conductor and comprising an inductor and a capacitor to generate an oscillation signal in response to changed impedance during a touch operation through the conductor; and
an insulator disposed between a first terminal of the inductor and the conductor, and between a second terminal of the inductor separated from the first terminal of the inductor and the conductor,
wherein the insulator comprises a first insulator disposed between the first terminal and the conductor spaced apart from a second insulator disposed between the second terminal and the conductor, such that a side surface of the first insulator faces a side surface of the second insulator, and
wherein the inductor comprises a coil pattern having a spiral shape connected between the first terminal and the second terminal.

19. The electronic device of claim 18, wherein a first terminal of the inductor and a second terminal of the inductor are disposed on an insulator disposed on a surface of the conductor on an internal side of the housing.

20. The electronic device of claim 19, further comprising a first conductor line disposed between the first terminal and the insulator, and a second conductor line disposed between the second terminal and the insulator.

21. The electronic device of claim 20, wherein the insulator comprises a first insulator disposed between the first conductor line and the conductor spaced apart from a second insulator disposed between the second conductor line and the conductor.

22. The electronic device of claim 18, further comprising a touch operation detector configured to detect a touch operation in response to the oscillation signal from the oscillator.

23. The electronic device of claim 18, further comprising a substrate disposed inside of the housing and spaced apart from the conductor,
wherein the inductor and the conductor are disposed on a surface of the substrate spaced apart from each other.

24. The electronic device of claim 18, further comprising:
a reference clock signal divider dividing an input reference clock signal by a division ratio to output a divided reference clock signal;
a periodic timer counting a one-period time of the divided reference clock signal using the oscillation signal to output a periodic count value;
a cascaded integrator-comb (CIC) filter comprising a cumulative amplifier performing cumulative amplification of the periodic count value received from the periodic timer, and a noise remover performing a moving average on an output value of the cumulative amplifier to output a count value with noise removed from the output value from the cumulative amplifier;
a delayed count value generator delaying the count value, received from the CIC filter, by a time determined in response to a delay control signal to output a delayed count value;

a subtractor subtracting the count value and the delayed count value received from the delayed count value generator to output a difference value; and an operator comparing the difference value, received from the subtractor, with a threshold value to output a detection signal higher or lower than the threshold value determined in response to a result of the comparing, wherein the oscillator comprises an amplifier connected to the inductor and the capacitor, outputting the oscillation signal comprising a resonant frequency, which varies during the touch operation, and wherein the touch operation is determined in response to the detection signal.

25. A mobile device comprising:

the electronic device of claim 18; and a controller;

wherein in response to a detected touch operation, the controller is configured to implement one or more of control power of the mobile device, lock the mobile device, navigate content display of a touch screen of the mobile device, control input to the touch screen, control color of the touch screen, control input to a speaker of the mobile device, and control volume of the speaker.

* * * * *